United States Patent
Damnjanovic et al.

(10) Patent No.: US 8,908,582 B2
(45) Date of Patent: Dec. 9, 2014

(54) USER EQUIPMENT OPERATION MODE AND CHANNEL OR CARRIER PRIORITIZATION

(75) Inventors: Jelena M. Damnjanovic, Del Mar, CA (US); Juan Montojo, San Diego, CA (US); Ravi Palanki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 591 days.

(21) Appl. No.: 13/024,282

(22) Filed: Feb. 9, 2011

(65) Prior Publication Data

US 2011/0199921 A1    Aug. 18, 2011

Related U.S. Application Data

(60) Provisional application No. 61/304,342, filed on Feb. 12, 2010.

(51) Int. Cl.
| | |
|---|---|
| G08C 17/00 | (2006.01) |
| H04W 4/00 | (2009.01) |
| H04L 12/28 | (2006.01) |
| H04B 7/185 | (2006.01) |
| H04W 52/36 | (2009.01) |
| H04W 52/28 | (2009.01) |

(52) U.S. Cl.
CPC .......... *H04W 52/367* (2013.01); *H04W 52/281* (2013.01)
USPC ........... 370/311; 370/329; 370/341; 370/431; 455/13.4

(58) Field of Classification Search
USPC ......... 370/310–350, 431, 436–439, 464–465, 370/478; 455/13.4, 62, 450–455, 464, 522; 709/208–211, 217–226
See application file for complete search history.

(56) References Cited

U.S. PATENT DOCUMENTS

| | | | | |
|---|---|---|---|---|
| 5,539,728 | A | * | 7/1996 | Gaiani et al. .................. 370/342 |
| 5,991,618 | A | | 11/1999 | Hall |
| 7,079,809 | B1 | * | 7/2006 | Scherzer .......................... 455/39 |
| 7,469,013 | B1 | * | 12/2008 | Bolt et al. ...................... 375/260 |
| 7,570,970 | B2 | * | 8/2009 | Duan et al. ..................... 455/522 |
| 7,778,217 | B2 | | 8/2010 | Lee et al. |

(Continued)

FOREIGN PATENT DOCUMENTS

| | | | | |
|---|---|---|---|---|
| EP | 1746776 | A2 | * 1/2007 | .............. H04L 12/28 |
| JP | 2007028637 | A | 2/2007 | |

(Continued)

OTHER PUBLICATIONS

International Search Report and Written Opinion - PCT/US2011/024451 - ISA/EPO - May 5, 2011 (101007WO).

(Continued)

*Primary Examiner* — Tri H Phan
(74) *Attorney, Agent, or Firm* — Larry Moskowitz; Ashish L. Patel

(57) ABSTRACT

A method for wireless communications is disclosed that includes determining a power operation control feature of a first mode of operation of a user equipment (UE). A channel prioritization is triggered based at least in part on the power operation control feature. A second configuration indicating UE operation in a second mode is received and is based on a UE generated report of a state resulting from the first mode of operation. The second mode of operation is then implemented.

39 Claims, 12 Drawing Sheets

(56) References Cited

U.S. PATENT DOCUMENTS

| | | | |
|---|---|---|---|
| 7,787,849 B2 * | 8/2010 | Rofougaran | 455/245.1 |
| 7,873,384 B2 * | 1/2011 | Karaoguz et al. | 455/553.1 |
| 7,881,264 B2 * | 2/2011 | Iacono et al. | 370/332 |
| 7,941,180 B2 * | 5/2011 | Karaoguz et al. | 455/556.1 |
| 8,031,686 B2 * | 10/2011 | Li et al. | 370/342 |
| 8,081,562 B2 * | 12/2011 | Charpentier et al. | 370/216 |
| 8,081,698 B2 | 12/2011 | Xu et al. | |
| 8,165,152 B2 * | 4/2012 | Sammour et al. | 370/437 |
| 8,417,187 B2 * | 4/2013 | Chen et al. | 455/63.1 |
| 8,489,152 B2 * | 7/2013 | Chen et al. | 455/574 |
| 8,504,102 B2 * | 8/2013 | Karaoguz et al. | 455/553.1 |
| 8,515,481 B2 * | 8/2013 | Chen et al. | 455/522 |
| 8,683,239 B2 * | 3/2014 | Hansalia et al. | 713/300 |
| 2007/0173279 A1 * | 7/2007 | Kuroda et al. | 455/522 |
| 2010/0159937 A1 * | 6/2010 | Gaal et al. | 455/450 |
| 2010/0215011 A1 * | 8/2010 | Pan et al. | 370/329 |
| 2011/0141928 A1 * | 6/2011 | Shin et al. | 370/252 |
| 2012/0093011 A1 * | 4/2012 | Ranta-Aho et al. | 370/252 |
| 2012/0140649 A1 * | 6/2012 | Choudhury et al. | 370/252 |
| 2012/0294167 A1 * | 11/2012 | Zhu et al. | 370/252 |

FOREIGN PATENT DOCUMENTS

| | | |
|---|---|---|
| JP | 2007520178 A | 7/2007 |
| JP | 2008501285 A | 1/2008 |
| KR | 20070011171 A | 1/2007 |
| WO | 2005076500 A1 | 8/2005 |
| WO | 2005125054 A1 | 12/2005 |

OTHER PUBLICATIONS

Research in Motion UK Limited: "Remaining issues on Uplink Power Control for Carrier Aggregation", 3GPP Draft; R1-100569 (Rim-Up Power Control for CA), 3rd Generation Partnership Project (3GPP), Mobile Competence Centre ; 650, Route Des Lucioles ; F-06921 Sophia-Antipolis Cedex ; France, vol . RAN WG1, no. Valencia, Spain; 20100118, Jan. 12, 2010, XP050418186, [retrieved on Jan. 12, 2010].

Qualcomm Incorporated: "Non SC-FDM Transmission in UL of LTE-A", 3GPP Draft; RI-101482 Non SC-FDM TXMN Generation Partnership Project (3GPP), Mobile Competence Centre; 650, Route Des Lucioles ; F-06921 Sophia-Antipolis Cedex ; France, vol. RAN WG1, no. San Francisco, USA; 20100222, Feb. 16, 2010, XP050418936.

Taiwan Search Report—TW100104614—TIPO—Sep. 23, 2013.

* cited by examiner

USER EQUIPMENT OPERATION MODE AND CHANNEL OR CARRIER PRIORITIZATION

CROSS REFERENCE TO RELATED APPLICATION

This application claims the benefit of U.S. provisional patent application No. 61/304,342 filed Feb. 12, 2010, in the names of DAMNJANOVIC et al., the disclosure of which is expressly incorporated herein by reference in its entirety.

BACKGROUND

I. Field

The following description relates generally to wireless communications systems, and more particularly to configuration of mode of operation of user equipment based on power control regime of the power mode of operation.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the frequency subcarriers. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Typical telecommunication protocols, e.g., 3GPP Release 8, do not provide power control features for uplink (UL) communication during operation of user equipment. However, recent telecommunication protocols, e.g., 3GPP Release 10, enable at least two control regimes for communication in uplink for configured user equipment. Accordingly, conventional mechanism to configure user equipment can be inadequate.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

In one embodiment, a method for wireless communication includes receiving a first configuration indicating user equipment (UE) operation in a first mode. A power operation control feature of the first mode of operation is then determined and channel prioritization based at least in part on the power operation control feature is triggered. Based on a UE generated report of a state resulting from the first mode of operation, a second configuration is received indicating UE operation in a second mode. The second mode of operation is then implemented.

In another embodiment, a system for wireless communication includes a means for determining a power operation control feature of a first mode of operation and a means for triggering channel prioritization based at least in part on the power operation control feature. The system also includes a means for receiving a second configuration indicating UE operation in a second mode, which is based on a UE generated report of a state resulting from the first mode of operation. An implementing means implements the second mode of operation.

Additionally, a computer program product for wireless communication in a wireless network is provided that includes a computer-readable medium having a program code recorded thereon. The program code comprises program code to determine a power operation control feature of a first mode of operation and program code to trigger channel prioritization based at least in part on the power operation control feature. The program code receive a second configuration based on a UE generated report of a state resulting from the first mode of operation, the second configuration indicating UE operation in a second mode. Additionally, the program code implements the second mode of operation.

In another embodiment, an apparatus for wireless communication includes a memory and at least one processor coupled to the memory. The processor is configured to determine a power operation control feature of a first mode of operation and to trigger channel prioritization based at least in part on the power operation control feature. Additionally, the processor receives a second configuration based on a UE generated report of a state resulting from the first mode of operation where the second configuration indicates UE operation in a second mode. The processor implements the second mode of operation.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

System and methods are provided to configure mode of operation of user equipment based on a power control regime of the power mode of operation. For a power-limited uplink transmission regime, the UE applies a set of one or more rules to prioritize control and data channels based on format for uplink delivery of data and signaling, e.g., single-carrier format or multiple-carrier format. The UE generates a power headroom report and delivers the report to a base station, which can reconfigure the UE in a disparate mode of operation that affords disparate power control regime(s), or reschedule one or more telecommunication resources for the UE while maintaining the UE in the originally configured mode of operation that resulted in triggering channel prioritization.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

Figure 1:
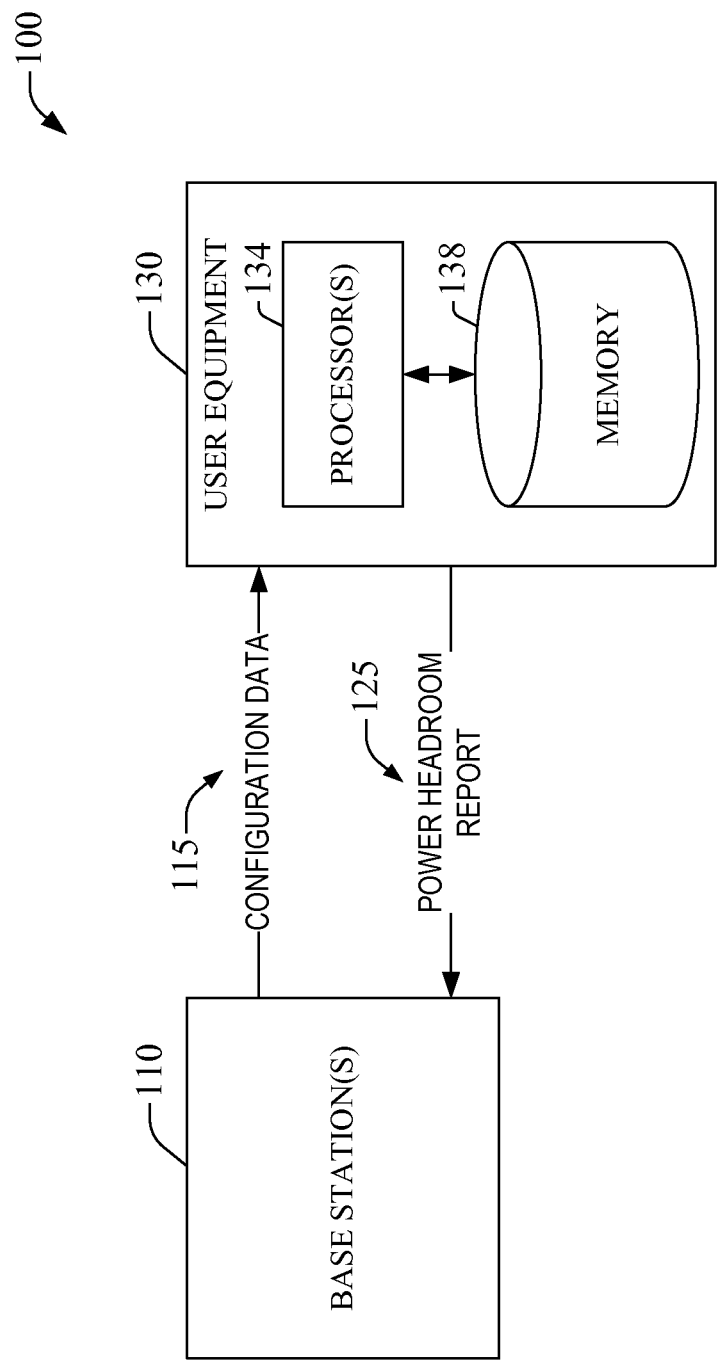
FIG. 1 is a high level block diagram of a system that exploits configuration of user equipment in accordance with aspects described herein.

FIG. 1 illustrates a high level block diagram of an example system 100 that exploits configuration of user equipment (UE) in accordance with aspects described herein. In example system 100, a base station 110 (also referred to as a node, evolved node B—eNB, serving eNB, target eNB, femtocell base station, picocell base station) delivers configuration data 115 that determines mode of operation of user equipment 130; user equipment 130 can be an access terminal (also referred to as terminal, user equipment, or mobile device). It should be appreciated that configuration data also can be delivered to disparate nodes with a wireless network platform (e.g., mobility management entity (MME)). The configuration data 115 can be received by processor(s) 134 in user equipment 130.

Based on the configuration data 115, UE 130 can determine a mode of operation (e.g., operation according to 3GPP Release 8 or 3GPP Release 10, or any other releases) and establish power control features or regimes afforded by the mode of operation. If the mode of operation affords non-power limited communication in the uplink, the processor 130 operates the UE 130 in accordance with the mode of operation under non-power limited control in uplink communication. In case the mode of operation includes power control features that impose power-limited telecommunication in the uplink, the UE 130, via at least the processor 130, can trigger channel prioritization to deliver communication in the uplink.

To implement channel prioritization, the UE 130, at least in part through processor(s) 134 applies a set of one or more carrier and/or channel priority rules (see, e.g., FIG. 9), which determine priority of uplink communication for control and data channels based at least in part on delivery protocol or format for uplink data and signaling; namely, single-carrier format or multiple-carrier (or multi-carrier) format. Based on application of such prioritization rules, the UE 130, via at least in part processor(s) 134, supplies (e.g., generates and delivers) a power headroom report 125, which is utilized by base station(s) 110 to further configure user equipment 130. Such configuration based on the power headroom report 125 can include maintaining the UE 130 in operation in a first mode of operation (e.g., an originally configured mode; see also FIG. 9) or switching to a disparate mode of operation (see, e.g., FIG. 8).

In addition, base station(s) 110 can employ the power headroom report 125 to reschedule transmission resource(s) granted to the UE 130. In an aspect, such utilization of the power headroom report 125 can be implemented if an originally configured mode of operation (e.g., 3GPP Release 10) is maintained as the mode of operation of the UE 130. In an aspect, the UE 130 can be a post-3GPP Release 8 mobile device which can be configured to operate in 3GPP Release 8 mode of operation, following, e.g., 3GPP Release 8 rules exclusively or 3GPP Release 10 mode of operation, e.g., including clustered data transmission on Physical Uplink Shared Channel (PUSCH), and concurrent Physical Uplink Control Channel (PUCCH).

In an aspect, the UE 130 in example system 100 includes a memory 138 that can be a computer-readable storage medium that retains code instructions that when executed by processor(s) 134, implement the functionality of the UE 130 in connection with operation configuration based on power control aspects supplied, at least in part, via configuration data 115 (which also can be retained in the memory 138).

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to subscribers. Such base stations (or wireless access points) can be arranged to provide contiguous areas of coverage to one or more cellular phones and/or other wireless terminals.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 2:
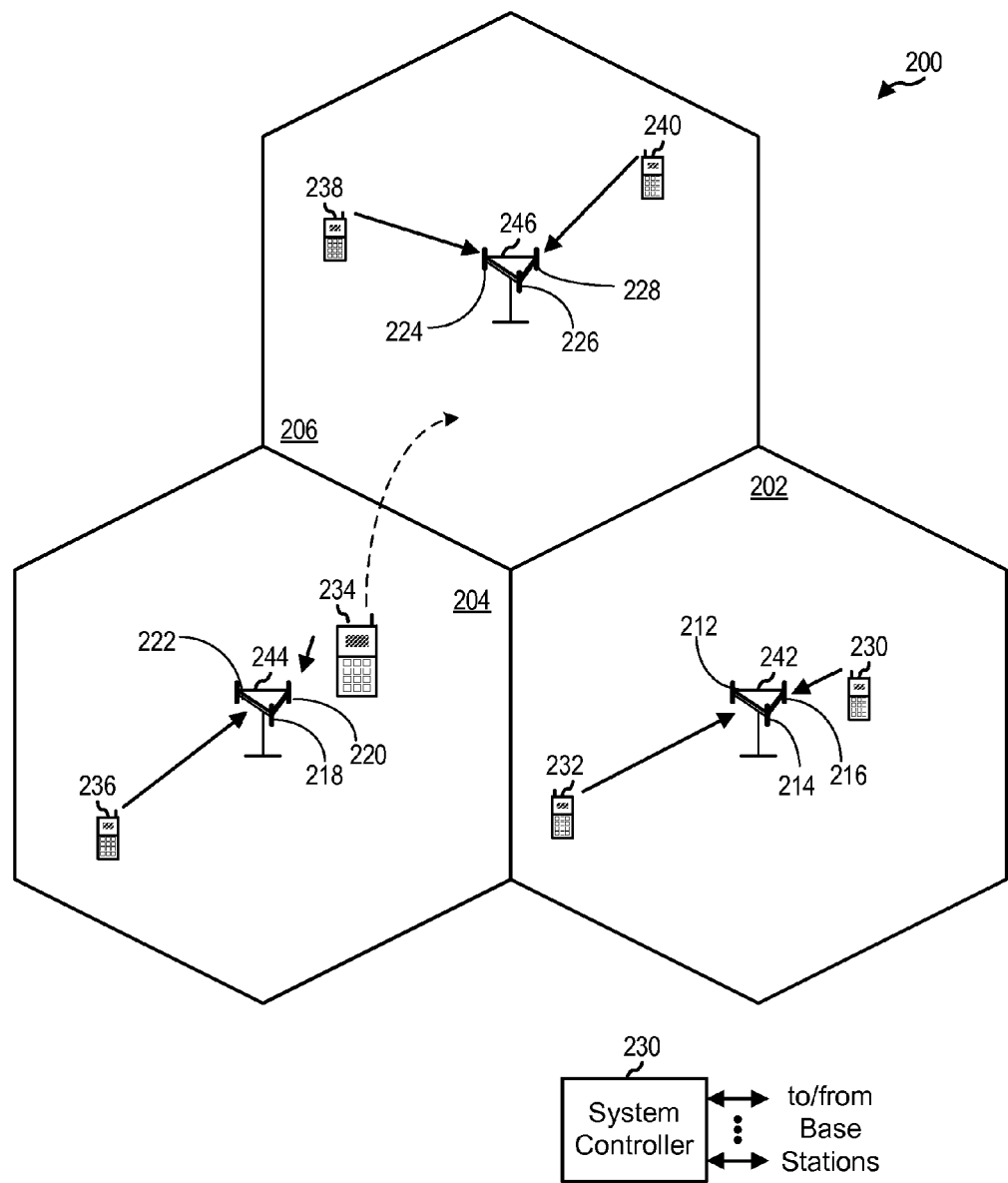
FIG. 2 illustrates a multiple access wireless communication system in accordance with aspects described herein.

Referring to FIG. 2, a multiple access wireless communication system 200 is illustrated. The multiple access wireless communication system 200 includes multiple cells, including cells 202, 204, and 206. In one aspect, the system 200, and the cells 202, 204, and 206 may include an eNode B that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 can include several wireless communication devices, e.g., user equipment or UEs, which can be in communication with one or more sectors of each cell 202, 204 or 206. For example, UEs 230 and 232 can be in communication with eNode B 242, UEs 234 and 236 can be in communication with eNode B 244, and UEs 238 and 240 can be in communication with eNode B 246.

Figure 3:
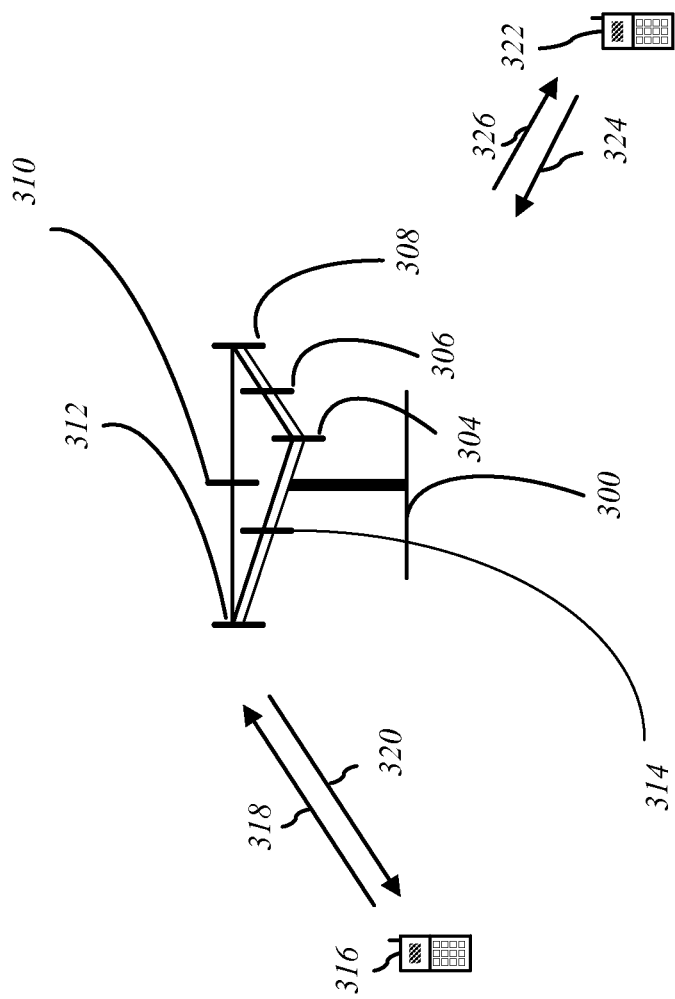
FIGS. 3 and 4 illustrate example communications systems that can be employed with wireless processing in accordance with aspects described herein.

Referring now to FIG. 3, a multiple access wireless communication system according to one aspect is illustrated. An eNode B 300 includes multiple antenna groups, one including antennas 304 and 306, another including antennas 308 and 310, and an additional group including antennas 312 and 314. In FIG. 3, only two antennas are shown for each antenna group, however, more or fewer antennas may be utilized for each antenna group. The UE 316 is in communication with antennas 312 and 314, where antennas 312 and 314 transmit information to the UE 316 over downlink 320 and receive information from access terminal 316 over the uplink 318. The UE 322 is in communication with antennas 306 and 308, where antennas 306 and 308 transmit information to access terminal 322 over the downlink 326 and receive information from access terminal 322 over the uplink 324. In a FDD system, communication links 318, 320, 324 and 326 may use different frequency for communication. For example, forward link 320 may use a different frequency then that used by reverse link 318.

Each group of antennas and/or the area in which they are designed to communicate is often referred to as a sector of the eNodeB. Antenna groups each are designed to communicate to UEs in a sector, of the areas covered by eNodeB 300. In communication over downlinks 320 and 326, the transmitting antennas of the eNodeB 300 utilize beam-forming in order to improve the signal-to-noise ratio of downlinks for the different UEs 316 and 324. Also, an eNodeB using beam-forming to transmit to UEs scattered randomly through its coverage causes less interference to UEs in neighboring cells than an eNodeB transmitting through a single antenna to all its UEs. A base station may be a fixed station used for communicating with the terminals and may also be referred to as an access point, an eNode B, or some other terminology. An access terminal may also be called an access terminal, user equipment (UE), a wireless communication device, terminal, access terminal or some other terminology.

Figure 4:
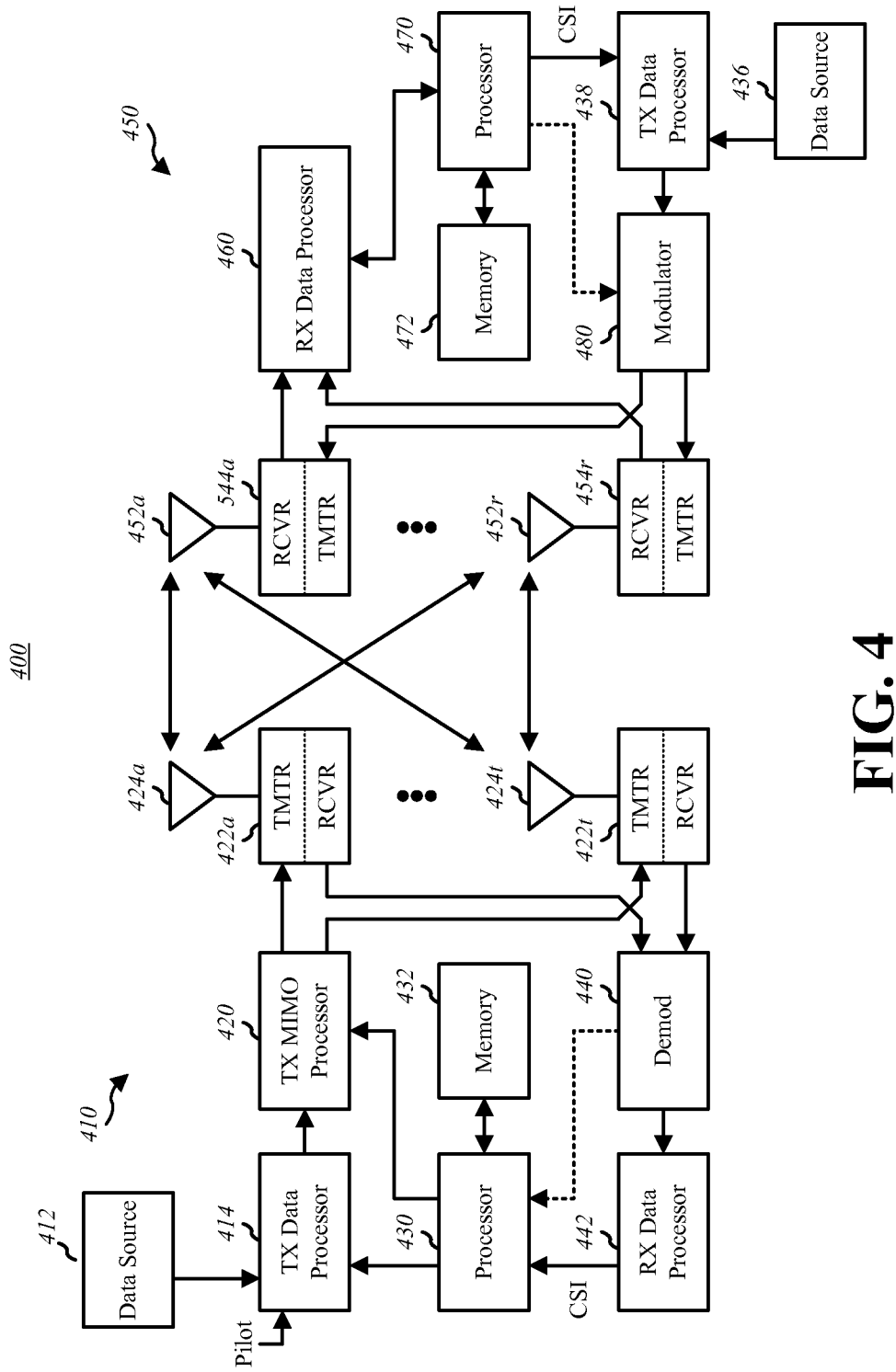

Referring to FIG. 4, a system 400 illustrates a transmitter system 410 (also known as the eNodeB) and a receiver system 450 (also known as UE) in a MIMO system 400. At the transmitter system 410, traffic data for a number of data streams is provided from a data source 412 to a transmit (TX) data processor 414. Each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430.

The modulation symbols for all data streams are then provided to a TX MIMO processor 420, which may further process the modulation symbols (e.g., for OFDM). TX MIMO processor 420 then provides NT modulation symbol streams to NT transmitters (TMTR) 422*a* through 422*t*. In certain embodiments, TX MIMO processor 420 applies beam-forming weights to the symbols of the data streams and to the antenna from which the symbol is being transmitted.

Each transmitter 422 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 422a through 422t are then transmitted from NT antennas 424a through 424t, respectively.

At receiver system 450, the transmitted modulated signals are received by NR antennas 452a through 452r and the received signal from each antenna 452 is provided to a respective receiver (RCVR) 454a through 454r. Each receiver 454 conditions (e.g., filters, amplifies, and down-converts) a respective received signal, digitizes the conditioned signal to provide samples, and further processes the samples to provide a corresponding "received" symbol stream.

An RX data processor 460 then receives and processes the NR received symbol streams from NR receivers 454 based on a particular receiver processing technique to provide NT "detected" symbol streams. The RX data processor 460 then demodulates, de-interleaves, and decodes each detected symbol stream to recover the traffic data for the data stream. The processing by RX data processor 460 is complementary to that performed by TX MIMO processor 420 and TX data processor 414 at transmitter system 410.

A processor 470 periodically determines which pre-coding matrix to use (discussed below). Processor 470 formulates a reverse link message comprising a matrix index portion and a rank value portion. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beam-forming weights then processes the extracted message.

Carrier Aggregation

LTE-Advanced UEs use spectrum having up to 20 Mhz bandwidths for each carrier in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 5A:
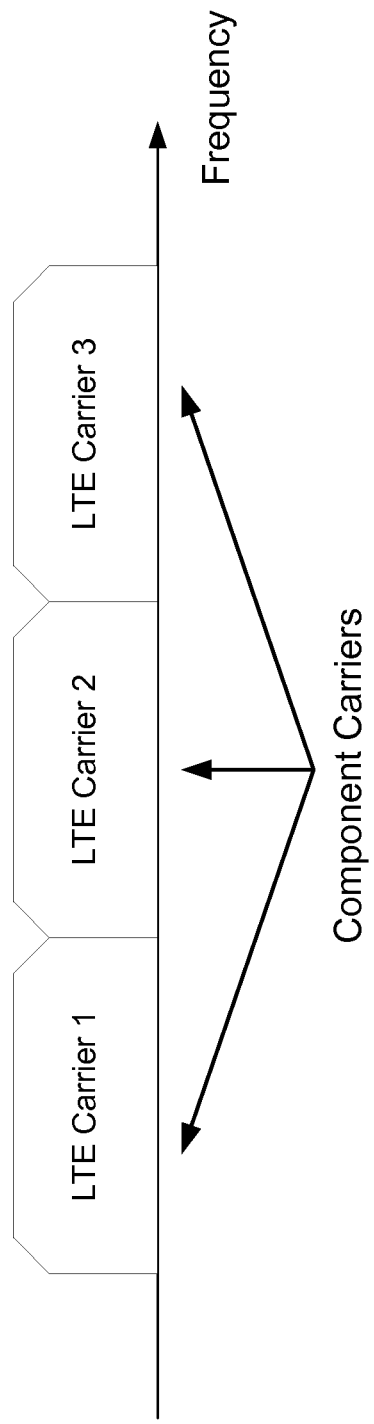
FIG. 5A discloses a continuous carrier aggregation type.
Figure 5B:
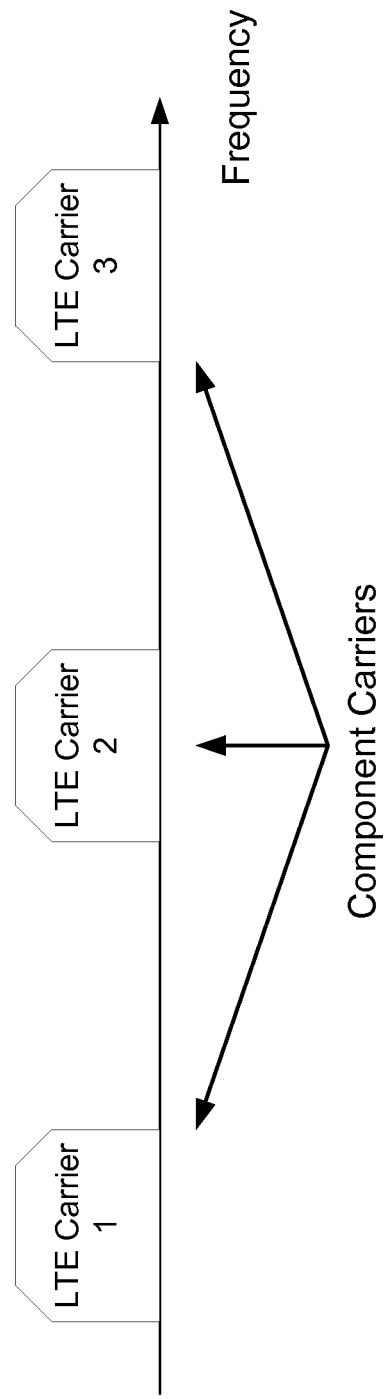
FIG. 5B discloses a non-continuous carrier aggregation type.

For the LTE-Advanced mobile systems, two types of carrier aggregation (CA) methods have been proposed, continuous CA and non-continuous CA. They are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 6:
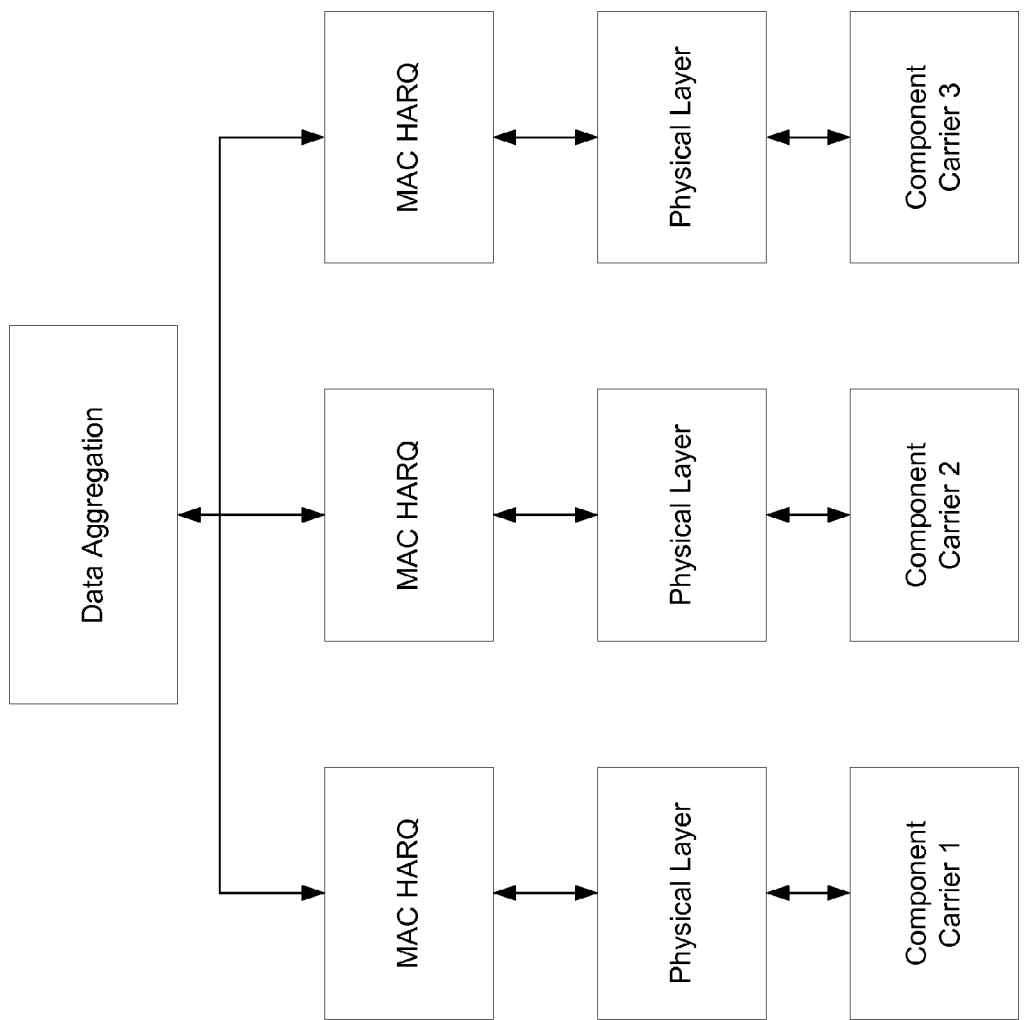
FIG. 6 discloses MAC layer data aggregation.

FIG. 6 illustrates aggregating transmission blocks (TBs) from different component carriers at the medium access control (MAC) layer for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 7:
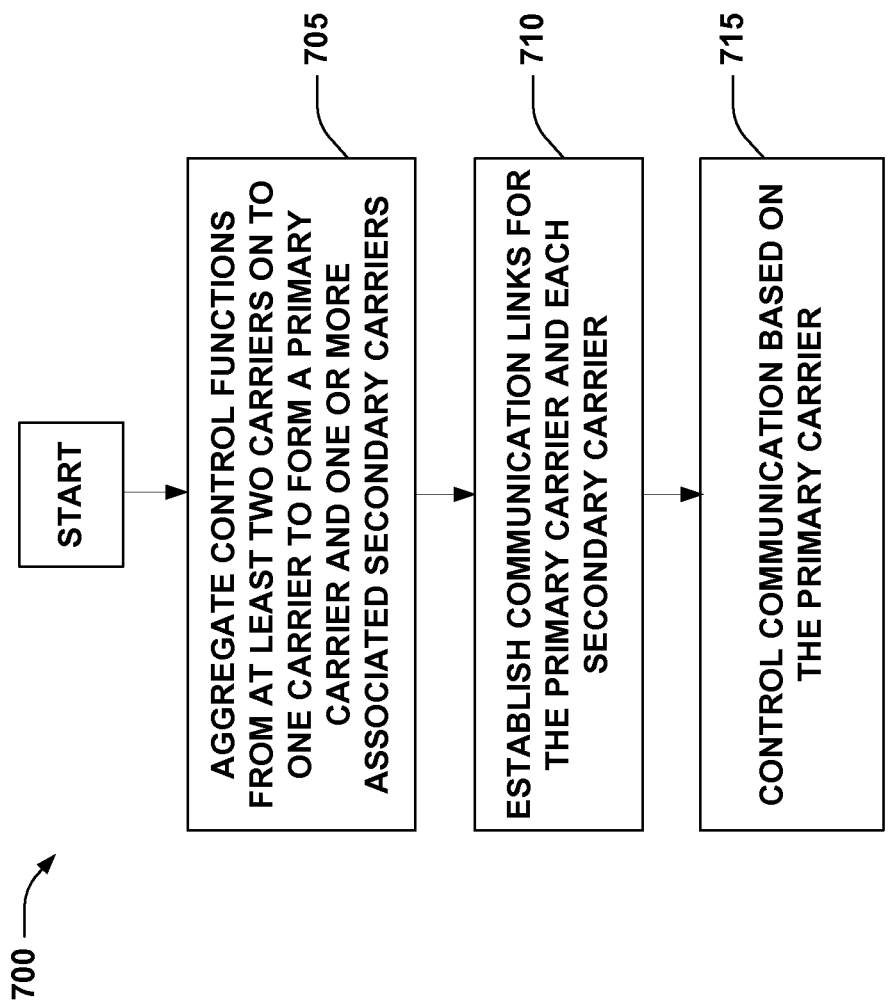
FIG. 7 is a block diagram illustrating a method for controlling radio links in multiple carrier configurations.

FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. Next at block, 710, communication links are established for the primary carrier and each secondary carrier. Then, communication is controlled based on the primary carrier in block 715.

Figure 8:
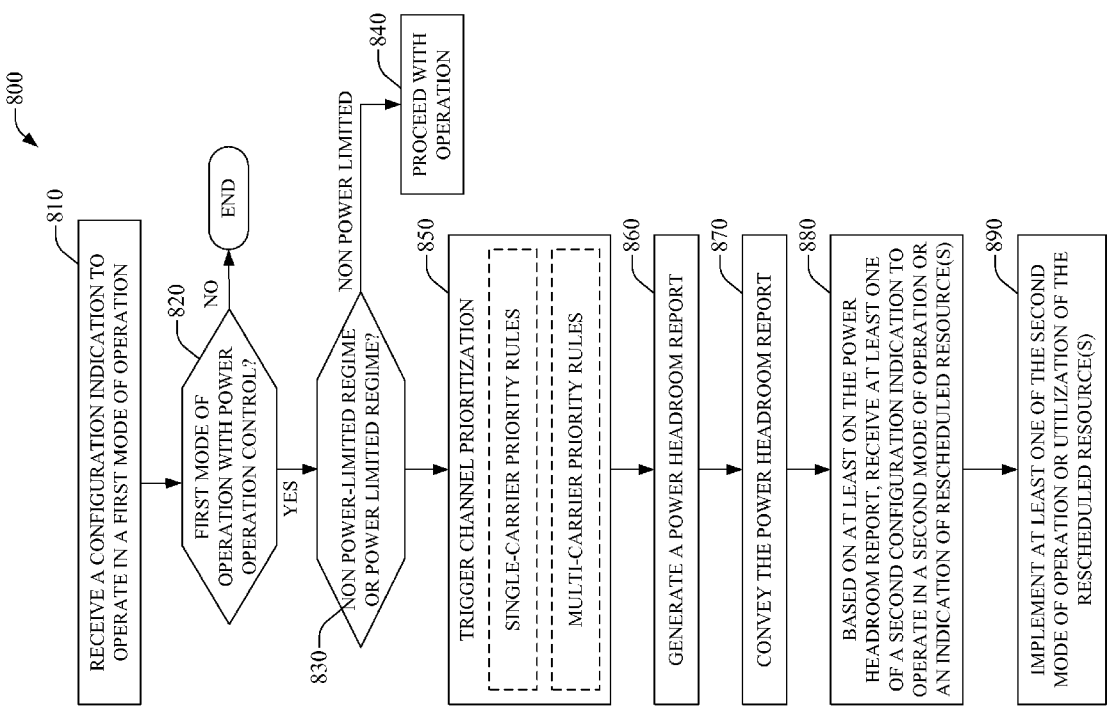
FIG. 8 is a flowchart of an example method for configuring user equipment operation in case of power-limited or non-power-limited uplink telecommunication in accordance with aspects described herein.

FIG. 8 is a flowchart of an example method for configuring user equipment operation in case of power-limited or non-power-limited uplink telecommunication in accordance with aspects described herein. While, for purposes of simplicity of explanation, the methodology (and other methodologies described herein) are shown and described as a series of acts, and it is to be understood and appreciated that the methodology is not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

At block 810, a first configuration indication to operate in a first mode of operation is received. In one example, the mode of operation may be 3GPP Release 8 or 3GPP Release 10. Additionally, in one embodiment, Release 8 and Release 10 are synonymous for a package of particular features. At block 820, it is determined whether the first mode of operation includes power operation control. If the first mode of operation does not include power operation control, the subject example method terminates. Conversely, if the first mode of operation includes power operation control, then the example method proceeds to block 830, where it determines whether the power operation control allows a non power-limited regime or a power-limited regime. In the case of a non power-limited regime, the operation proceeds, at block 840 without implementation of one or more aspects described herein. In the case of a power-limited regime for uplink telecommunication, channel prioritization is triggered at block 850. Channel prioritization includes implementing one or more priority rules for uplink telecommunication based in part on channel (e.g., control channel (Physical UL Control Channel (PUCCH)) or data channel (e.g., Physical Uplink Shared Channel (PUSCH))), and protocol or format for uplink telecommunication (e.g., single-carrier format or multi-carrier format). The UE applies the priority rules to determine how to selectively distribute power across all the items to transmit. Priority rules may be defined for a single carrier configuration and for a multicarrier configuration.

In one example, for a single carrier configuration, power scaling is based on the following priority (in order of highest to lowest priority): RRC and MAC signaling on PUSCH, PUCCH, and PUSCH. Additionally, prioritization may be assigned within the PUCCH. In one example, priority is assigned (highest to lowest), as follows: feedback hierarchy (e.g., ACK/NACK, MIMO, SIMO), scheduling request (SR), rank indicator (RI), channel quality indicator/precoding matrix indicator (including wideband and sub-band), SRS (sounding reference signals).

In an example for multicarrier configuration, power scaling may be based on the following hierarchy of priority: carriers that carry RRC and MAC signaling on PUSCH, PUCCH across carriers and PUSCH across carriers. Additionally, hierarchy of priority rules may be configured within PUCCH as follows: ACK/NACK (including MIMO and SIMO), scheduling request (SR), rank indicator (RI), CQI/PMI (wideband and sub-band), and SRS.

A report, such as a power headroom report or CQI report, is generated at block 860, based on the channel prioritization and implementing the one or more priority rules. The report is then conveyed at block 870. At block 880, based on the report, a second configuration indication to operate in a second mode of operation or an indication of rescheduled resources is received. At block 890, at least one of the second mode of operation (e.g., 3GPP Release 8 if the first mode of operation is 3GPP Release 10) or utilization of the rescheduled resource(s) is implemented.

Figure 9:
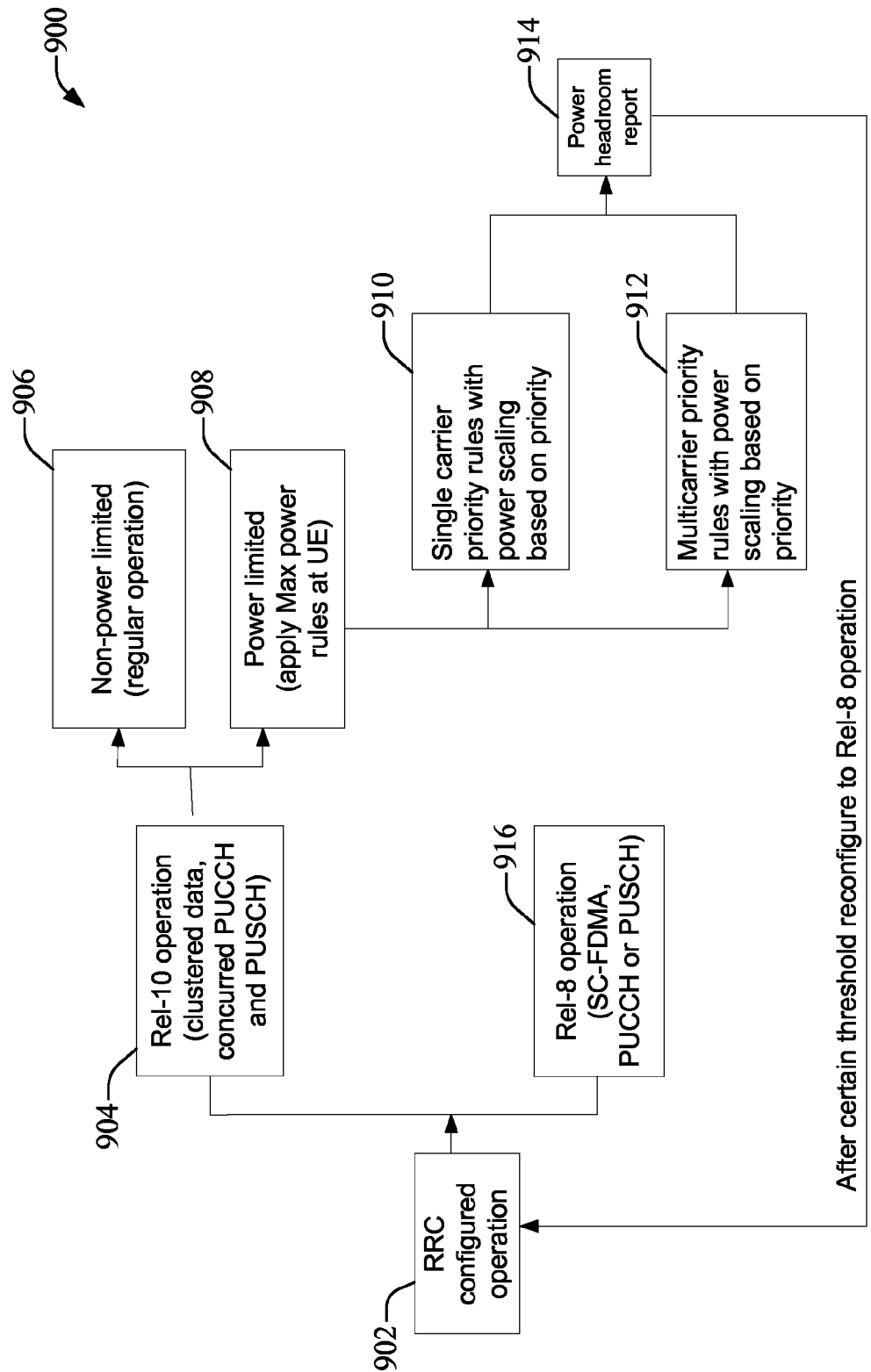
FIG. 9 illustrates example logic associated with user equipment configuration in accordance with aspects described herein.

FIG. 9 illustrates example logic associated with a user equipment configuration in accordance with aspects described herein. As illustrated, two primary modes of operation such as 3GPP Release 8 and 3GPP Release 10 may be considered. In one embodiment, the Release 8 and Release 10 modes of operation are synonyms for packages of features. Those skilled in the art will appreciate that other modes of operation can be considered, such as particular modes of operation that enable or afford power-limited and non power-limited uplink communication. In one example, a Radio Resource Control (RRC) message is received at block 902. The RRC message may configure the mode for the UE. If Release 10 operation (or any post 3GPP Release 8 operation) is configured at block 904, it is determined whether a non-power limited regime or scenario 906 is to occur. However, if power limitation occurs during operation, as conveyed by an indication received from a base station, certain procedures and channel prioritization can be triggered at 908. For a single carrier configuration, a set of priority rules for power scaling are implemented at 910. Likewise, for a multicarrier configuration, an alternate set of priority rules for power scaling is applied at 912.

A report, such as a power headroom report, may be generated at block 914 and delivered to a base station (e.g., base station 110) to which the UE is attached. The report may inform the base station of the power limitation and/or other operation conditions (e.g., previous power headroom report, channel quality conditions, as conveyed by indicators such as Channel Quality Indicators precoding matrix indicator). Additionally, these quantities can be retained in the memory 138. Based on such intelligence, or information, which may include at least one power headroom report, the base station can determine to adjust or revise scheduling decisions for the UE (e.g., 130) but maintain the UE in an originally scheduled mode of operation, e.g., 3GPP Release 10, or reconfigure the UE to operate in a disparate mode of operation, such as 3GPP Release 8 mode 916 as illustrated in FIG. 9. The reconfiguration of mode of operation (e.g., from Release 10 to Release 8) may occur when a power headroom report exceeds a predetermined threshold. For example, if there is a misalignment between the UE and the eNodeB about the UE power requirements for transmission, then the eNodeB may give assignments to the UE that require more power than the UE can actually transmit. In this case, power headroom is negative. If this behavior occurs frequently the eNodeB may decide to put a UE into a mode of operation that requires less power and/or less power backoff.

Figure 10:
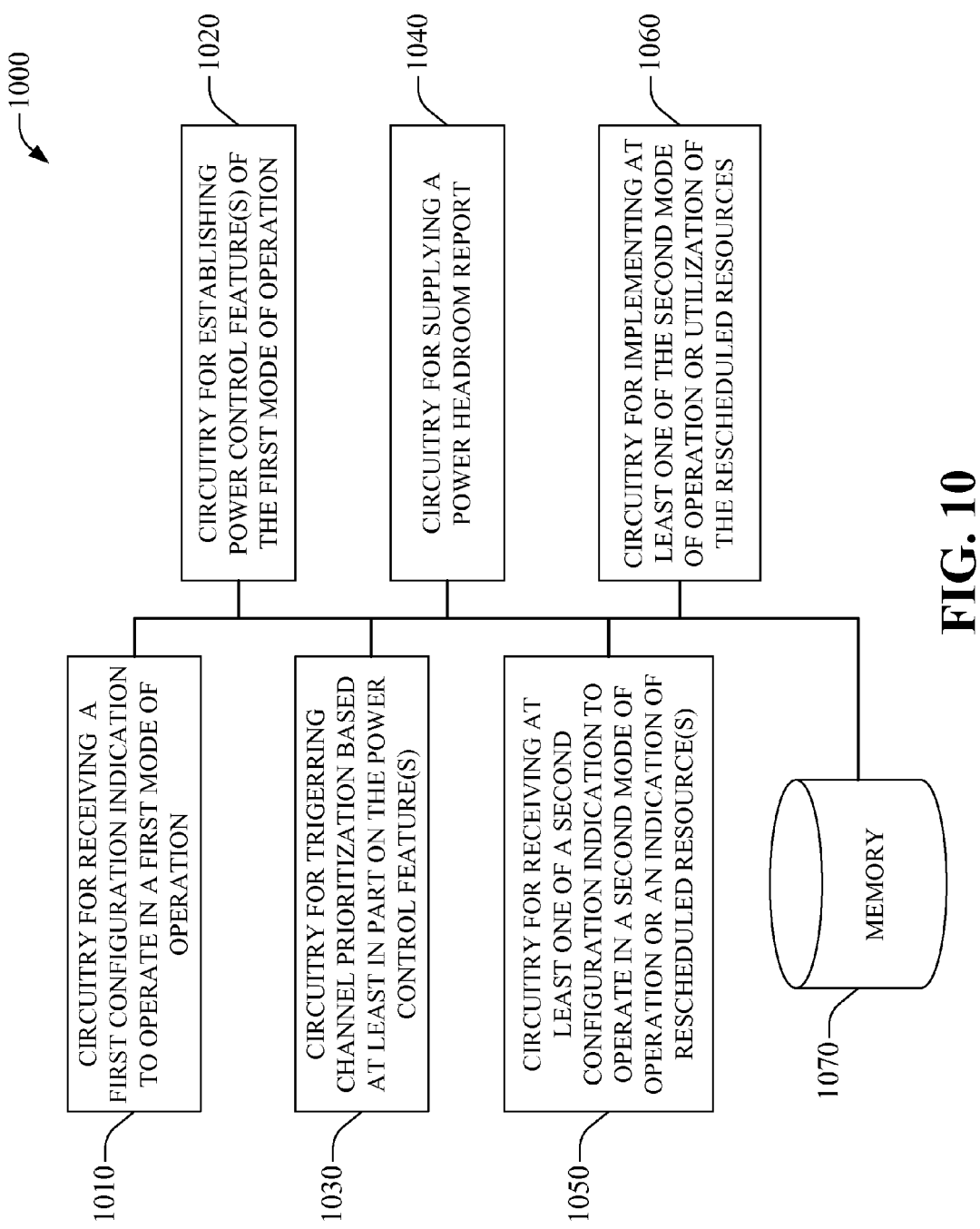
FIG. 10 illustrates an example system that enable user equipment configuration in accordance with aspects described herein.

FIG. 10 illustrates an example wireless communication system 1000. The system 1000 includes electronic circuitry (also referred to as circuitry) 1010 for receiving a first configuration indication to operate in a first mode of operation; circuitry 1020 for establishing power control feature(s) of the first mode of operation; circuitry 1030 for triggering channel prioritization based at least in part on the power control feature(s); circuitry 1040 for supplying a power headroom report; circuitry 1050 for receiving at least one of a second configuration indication to operate in a second mode of operation or an indication of rescheduled resource(s); and circuitry 1060 for implementing at least one of the second mode of operation or utilization of the rescheduled telecommunication resource(s), or resource(s). The example wireless communication system 1000 also includes a memory 1070 that can include code instructions that when executed by at least one processor, which can be part of the described circuitry, enable the various aspects or features described herein in connection with configuration of user equipment (e.g., UE 130).

Figures 11A, 11B:
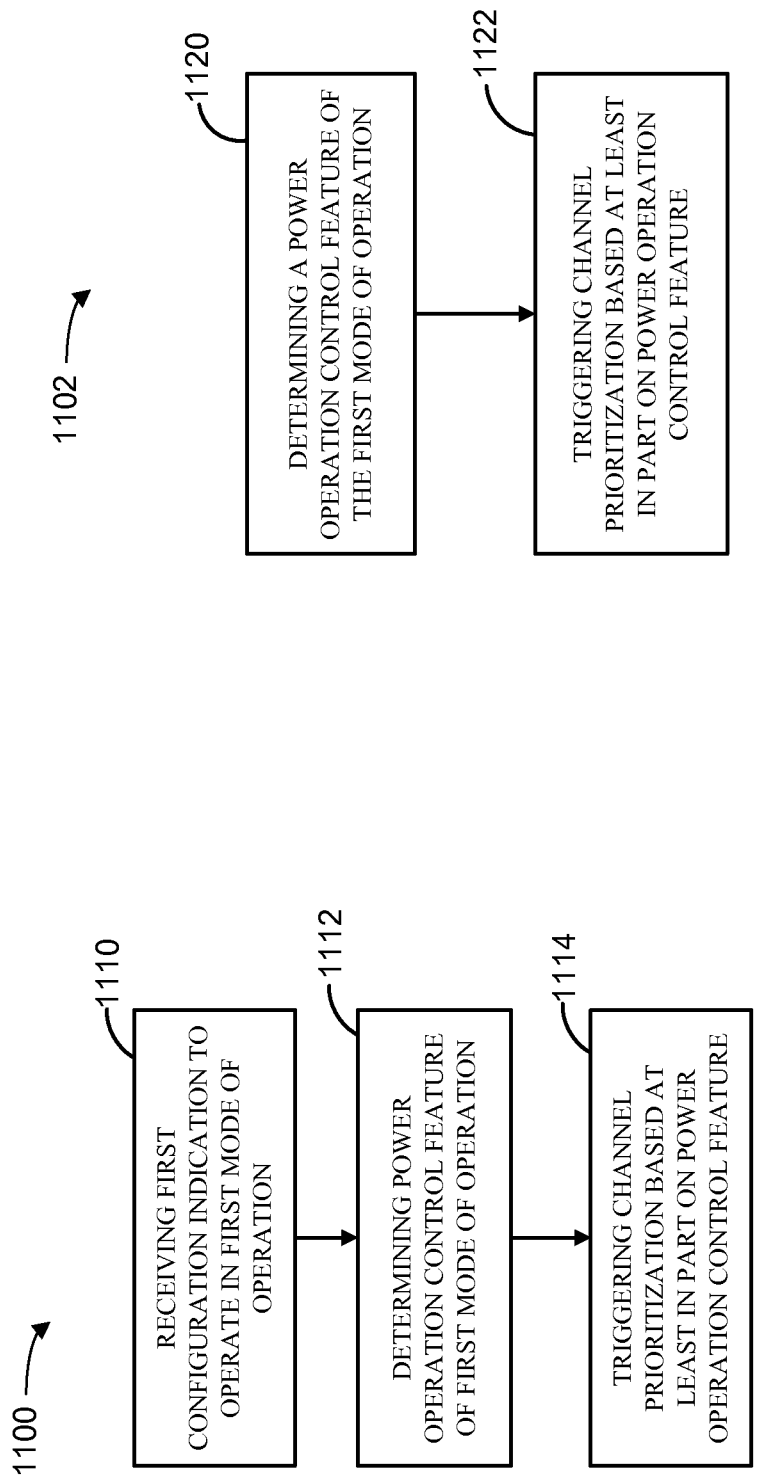
FIGS. 11A-B are flow charts illustrating exemplary logic in accordance with aspects described herein.

FIG. 11A is an example block diagram illustrating a method for configuring user equipment. In the example method 1100, a first configuration indication to operate in a first mode of operation is received, at block 1110. Next, in block 1112, a power control operation feature of the first mode of operation is determined Channel prioritization based at least in part on the power operation control feature is then triggered at block 1114.

FIG. 11B is an example block diagram illustrating a method for configuring user equipment. In the example method 1102, the power control operation feature of the first mode of operation is determined, at block 1120. Then, at block 1122, the channel prioritization based at least in part on the power operation control feature is triggered.

In one configuration, the eNodeB 110 is configured for wireless communication and includes receiving means, determining means and triggering means. In one aspect, the aforementioned receiving means may be the processor 430 configured to perform the functions recited by the aforementioned means. In another aspect, the aforementioned means may be a module or any apparatus configured to perform the functions recited by the aforementioned means. In one aspect, the aforementioned determining means may be the processor 430 configured to perform the functions recited by the aforementioned means. In another aspect, the aforementioned means may be a module or any apparatus configured to perform the functions recited by the aforementioned means. In one aspect, the aforementioned triggering means may be the processor 430 configured to perform the functions recited by the aforementioned means. In another aspect, the aforementioned means may be a module or any apparatus configured to perform the functions recited by the aforementioned means.

In one embodiment, logical channels are classified into Control Channels and Traffic Channels. Logical Control Channels comprises Broadcast Control Channel (BCCH) which is downlink channel for broadcasting system control information. Paging Control Channel (PCCH) which is downlink channel that transfers paging information. Multicast Control Channel (MCCH) which is Point-to-multipoint downlink channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint downlink channel for transmitting traffic data.

Transport Channels are classified into downlink and uplink. Downlink Transport Channels comprises a Broadcast Channel (BCH), Downlink Shared Data Channel (downlink-SDCH) and a Paging Channel (PCH), the PCH for support of UE power saving (DRX cycle is indicated by the network to the UE), broadcasted over entire cell and mapped to PHY resources which can be used for other control/traffic channels. The uplink Transport Channels comprises a Random Access Channel (RACH), a Request Channel (REQCH), an Uplink Shared Data Channel (UL-SDCH) and plurality of PHY channels. The PHY channels comprise a set of downlink channels and uplink channels.

The downlink PHY channels comprises: Common Pilot Channel (CPICH), Synchronization Channel (SCH), Common Control Channel (CCCH), Shared downlink Control Channel (SDCCH), Multicast Control Channel (MCCH), Shared UL Assignment Channel (SUACH), Acknowledgement Channel (ACKCH), downlink Physical Shared Data Channel (DL-PSDCH), UL Power Control Channel (UPCCH), Paging Indicator Channel (PICH), and Load Indicator Channel (LICH).

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Other terms include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, Downlink (base station to subscriber transmission), DL-SCH downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access.

It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
  receiving a first configuration indicating user equipment (UE) operation in a first mode;
  determining a power operation control feature of the first mode of operation;
  triggering channel prioritization based at least in part on the power operation control feature and on what channel is being transmitted and whether the UE is configured in single carrier format;
  based on a UE generated report of a state resulting from the first mode of operation, receiving a second configuration indicating UE operation in a second mode; and
  implementing the second mode of operation.

2. The method of claim 1, in which the determining comprises determining a power operation control feature of the first mode of operation depending on whether the UE is power limited.

3. The method of claim 1, in which the first mode of operation is 3GPP release 10 and the second mode of operation is 3GPP Release 8/9, and in which each mode of operation includes release specific features.

4. The method of claim 1, in which the report comprises at least one of a power headroom report, a CQI (channel quality indicator) report and a measurement report.

5. The method of claim 1, in which the channel prioritization includes one of single carrier priority rules with power scaling and multicarrier priority rules with power scaling.

6. The method of claim 5, in which the channel prioritization assigns priority for transmissions, in order of highest to lowest, as radio resource control (RRC) signaling and medium access control (MAC) signaling on a physical uplink shared channel (PUSCH); physical uplink control channel (PUCCH) transmissions, and non RRC/MAC physical uplink shared channel (PUSCH) transmissions.

7. The method of claim 6, in which a hierarchy of priority rules is configured within the physical uplink control channel (PUCCH), from highest to lowest priority, as error correction feedback signals, scheduling requests, rank indicators, channel quality indicator (CQI) report/precoding matrix indicator (PMI) signals, and sounding reference signals.

8. The method of claim 1, further comprising reconfiguring a mode of operation from the first mode to the second mode, when a power headroom report exceeds a predetermined threshold.

9. A method for wireless communications, comprising:
determining a power operation control feature of a first mode of operation of a User Equipment (UE);
triggering channel prioritization based at least in part on the power operation control feature and on what channel is being transmitted and whether the UE is configured in single carrier format;
based on a UE generated report of a state resulting from the first mode of operation, receiving a second configuration indicating UE operation in a second mode; and
implementing the second mode of operation.

10. The method of claim 9, in which the determining comprises determining a power operation control feature of the first mode of operation depending on whether the UE is power limited.

11. The method of claim 9, in which the first mode of operation is 3GPP release 10 and the second mode of operation is 3GPP Release 8/9, and in which each mode of operation includes release specific features.

12. The method of claim 9, in which the report comprises at least one of a power headroom report, a CQI (channel quality indicator) report and a measurement report.

13. The method of claim 9, in which the channel prioritization includes one of single carrier priority rules with power scaling and multicarrier priority rules with power scaling.

14. The method of claim 13, in which the channel prioritization assigns priority for transmissions, in order of highest to lowest, as: radio resource control (RRC) signaling and medium access control (MAC) signaling on a physical uplink shared channel (PUSCH); physical uplink control channel (PUCCH) transmissions, and non RRC/MAC physical uplink shared channel (PUSCH) transmissions.

15. The method of claim 14, in which a hierarchy of priority rules is configured within the physical uplink control channel (PUCCH), from highest to lowest priority, as error correction feedback signals, scheduling requests, rank indicators, channel quality indicator (CQI) report/precoding matrix indicator (PMI) signals, and sounding reference signals.

16. The method of claim 9, further comprising reconfiguring a mode of operation from the first mode to the second mode, when a power headroom report exceeds a predetermined threshold.

17. An apparatus for wireless communication, comprising:
means for determining a power operation control feature of a first mode of operation;
means for triggering channel prioritization based at least in part on the power operation control feature and on what channel is being transmitted and whether the UE is configured in single carrier format;
based on a UE generated report of a state resulting from the first mode of operation, means for receiving a second configuration indicating UE operation in a second mode; and
means for implementing the second mode of operation.

18. The apparatus of claim 17, further comprising a means for receiving a first configuration indicating User Equipment (UE) operation in the first mode.

19. The apparatus of claim 17, in which the determining means comprises determining a power operation control feature of the first mode of operation depending on whether the UE is power limited.

20. The apparatus of claim 17, in which the first mode of operation is 3GPP release 10 and the second mode of operation is 3GPP Release 8/9, and in which each mode of operation includes release specific features.

21. The apparatus of claim 17, in which the report comprises at least one of a power headroom report, a CQI (channel quality indicator) report and a measurement report.

22. The apparatus of claim 17, in which the channel prioritization includes one of single carrier priority rules with power scaling and multicarrier priority rules with power scaling.

23. The apparatus of claim 22, in which the channel prioritization assigns priority for transmissions, in order of highest to lowest, as radio resource control (RRC) signaling and medium access control (MAC) signaling on a physical uplink shared channel (PUSCH); physical uplink control channel (PUCCH) transmissions, and non RRC/MAC physical uplink shared channel (PUSCH) transmissions.

24. The apparatus of claim 23, in which a hierarchy of priority rules is configured within the physical uplink control channel (PUCCH), from highest to lowest priority, as error correction feedback signals, scheduling requests, rank indicators, channel quality indicator (CQI) report/precoding matrix indicator (PMI) signals, and sounding reference signals.

25. The apparatus of claim 17, further comprising means for reconfiguring a mode of operation from the first mode to the second mode, when a power headroom report exceeds a predetermined threshold.

26. A computer program product for wireless communication in a wireless network, comprising:
a non-transitory computer-readable medium having a program code recorded thereon, the program code comprising:
program code to determine a power operation control feature of a first mode of operation;
program code to trigger channel prioritization based at least in part on the power operation control feature and on what channel is being transmitted and whether the UE is configured in single carrier format;
program code to receive a second configuration based on a UE generated report of a state resulting from the first mode of operation, the second configuration indicating UE operation in a second mode; and program code to implement the second mode of operation.

27. The computer program product of claim 26, in which the program code further comprises program code to receive a first configuration indicating User Equipment (UE) operation in the first mode.

28. The computer program product of claim 26, in which the program code to determine a power operation control feature of the first mode of operation depends on whether the UE is power limited.

29. The computer program product of claim 26, in which the first mode of operation is 3GPP release 10 and the second mode of operation is 3GPP Release 8/9, and in which each mode of operation includes release specific features.

30. The computer program product of claim 26, in which the channel prioritization includes one of single carrier priority rules with power scaling and multicarrier priority rules with power scaling.

31. An apparatus for wireless communication, comprising:
a memory; and
at least one processor coupled to the memory, the at least one processor being configured:
to determine a power operation control feature of a first mode of operation;
to trigger channel prioritization based at least in part on the power operation control feature and on what channel is being transmitted and whether the UE is configured in single carrier format;
to receive a second configuration based on a UE generated report of a state resulting from the first mode of operation, the second configuration indicating UE operation in a second mode; and
to implement the second mode of operation.

32. The apparatus of claim 31, in which the processor is further configured to receive a first configuration indicating User Equipment (UE) operation in the first mode.

33. The apparatus of claim 31, in which the processor is further configured to determine a power operation control feature of the first mode of operation depending on whether the UE is power limited.

34. The apparatus of claim 31, in which the first mode of operation is 3GPP release 10 and the second mode of operation is 3GPP Release 8/9, and in which each mode of operation includes release specific features.

35. The apparatus of claim 31, in which the report comprises at least one of a power headroom report, a CQI (channel quality indicator) report and a measurement report.

36. The apparatus of claim 31, in which the channel prioritization includes one of single carrier priority rules with power scaling and multicarrier priority rules with power scaling.

37. The apparatus of claim 36, in which the channel prioritization assigns priority for transmissions, in order of highest to lowest, as: radio resource control (RRC) signaling and medium access control (MAC) signaling on a physical uplink shared channel (PUSCH); physical uplink control channel (PUCCH) transmissions, and non RRC/MAC physical uplink shared channel (PUSCH) transmissions.

38. The apparatus of claim 37, in which a hierarchy of priority rules is configured within the physical uplink control channel (PUCCH), from highest to lowest priority, as error correction feedback signals, scheduling requests, rank indicators, channel quality indicator (CQI) report/precoding matrix indicator (PMI) signals, and sounding reference signals.

39. The apparatus of claim 31, in which the processor is further configured to reconfigure a mode of operation from the first mode to the second mode, when a power headroom report exceeds a predetermined threshold.

* * * * *